United States Patent [19]

Walter et al.

[11] 4,076,979

[45] Feb. 28, 1978

[54] BOTTLE COLOR IDENTIFICATION APPARATUS

[75] Inventors: Arthur Walter, Denzlingen; Günter Fetzer, Gundelfingen; Jurgen Erdmann, Buchholz, all of Germany

[73] Assignee: Erwin Sick Gesellschaft mit beschrankter Haftung Optik-Elektronik, Waldkirch, Germany

[21] Appl. No.: 701,341

[22] Filed: Jun. 30, 1976

[30] Foreign Application Priority Data

Jul. 29, 1975 Germany .............................. 2533873

[51] Int. Cl.$^2$ ............................ G01J 3/34; G01J 3/50
[52] U.S. Cl. ................................ 250/226; 250/223 B; 209/111.6; 356/178
[58] Field of Search ........................... 250/226, 223 B; 356/240, 178; 209/111.6

[56] References Cited

U.S. PATENT DOCUMENTS

| 3,228,520 | 1/1966 | Schneider | 209/111.6 |
| 3,351,198 | 11/1967 | Wyman | 209/111.6 |
| 3,994,591 | 11/1976 | Gibbard | 356/178 |

Primary Examiner—Alfred E. Smith
Assistant Examiner—David K. Moore

[57] ABSTRACT

Bottle color identification apparatus with a light beam passing through the bottle, in which the light beam passing through the bottle is supplied to a spectral decomposition arrangement which emits a signal characteristic of the bottle color.

A special application of the invention is the sorting of returnable bottles having the same size and shape but different colors.

7 Claims, 4 Drawing Figures

BOTTLE COLOR IDENTIFICATION APPARATUS

BACKGROUND OF THE INVENTION

The invention relates to an apparatus for the identification of bottle colours with a light beam which passes through the bottle.

The reusable returnable bottles of the beverages industry are mainly made from brown, green or white glass. The colour of the glass generally depends thereby on the bottle content. On returning empties, there are frequently bottles of the same size but different colours so that before re-filling they must be divided up according to the bottle colour. This cannot be based on the bottle shape or size due to the fact that these do not differ so that only the bottle colour can be used as a separating criterion.

BRIEF SUMMARY OF THE INVENTION

The problem of the invention is therefore to provide an apparatus of the type indicated hereinbefore which reliably and simply ensures a colour differentiation of different objects, particularly bottles traversed by the light beam.

According to the invention, this problem is solved in that the light beam passing through the bottle is supplied to a spectral decomposition arrangement which emits a signal characteristic of the bottle colour. It is thus possible to sort the bottles in fully automatic manner on the basis of their colours without involving an operator.

The spectral decomposition arrangement comprises preferably differently filtered photoelectric cells, whereby both the single signals of the photoelectric cells and also signals combined from the single signals are used for colour identification purposes. It is thus possible to differentiate a larger number of colours than there are photoelectric cells.

Preferably a parallel light beam is used whose width is substantially the same as the width of the bottle neck and which is arranged level with the bottle neck. This ensures an optimum change to the light beam on passing through the neck of a bottle which is preferably conveyed on a conveyor belt at right angles to the light beam. This facilitates colour indication and timing.

The apparatus according to the invention is preferably only used for the differentiation of brown, green and white glass. In this case the spectral decomposition arrangement appropriately comprises a beam splitter by which the light beam is diverted to two photoelectric cells in front of which are arranged different filters. The filters are thereby selected in such a way that one photoelectric cell is sensitive for green and the other for brown.

The output signals of the two photoelectric cells are then preferably not only individually evaluated but are also interconnected for forming a white signal. For this purpose the output signals of the two photoelectric cells are applied to the two inputs of two comparators, optionally via current-voltage transformers, whose outputs are connected via three AND gates for forming a white, green and brown signal.

According to a particularly preferred embodiment, the reduction of the light beam width on passing through the bottle neck is utilised for supplying a read-out command to the evaluation electronics. Thus the apparatus operates in a self-timing manner, i.e. when a bottle neck passes through the operating area the evaluation electronics are caused to emit the colour signal determined.

A particularly advantageous practical embodiment is constructed in such a way that behind the working area three photoelectric cells are arranged in the beam path in such a way that when a bottle neck is present in the operating area only the central cell is illuminated by the light bundle, whereas when no bottle neck is present this happens to all three cells. The three photoelectric cells are preferably arranged on the unoccupied side of the preferably physical beam splitter. By reflection on the filters or lens surfaces sufficient light still reaches the arrangement of the three photoelectric cells via the beam splitter to permit self-timing of the apparatus with minimum effort and expenditure.

The outputs of the AND gates are appropriately applied to flip flops which are caused to accept the colour signals occurring on one of the three AND gates when a bottle neck appears in the operating area by a combinatorial circuit on which acts the timing photoelectric cells.

BRIEF DESCRIPTION OF THE DRAWINGS

Other and further objects of the present invention will be apparent from the following description and claims and are illustrated in the accompanying drawings which by way of illustration show preferred embodiments of the present invention and the principles thereof, and what are now considered to be the best modes contemplated for applying these principles. Other embodiments of the invention embodying the same or equivalent principles may be used, and structural changes may be made if desired by those skilled in the art without departing from the invention and the scope of the appended claims. In the drawings show:

DETAILED DESCRIPTION OF THE PREFERRED EMBODIMENTS

Figure 1:
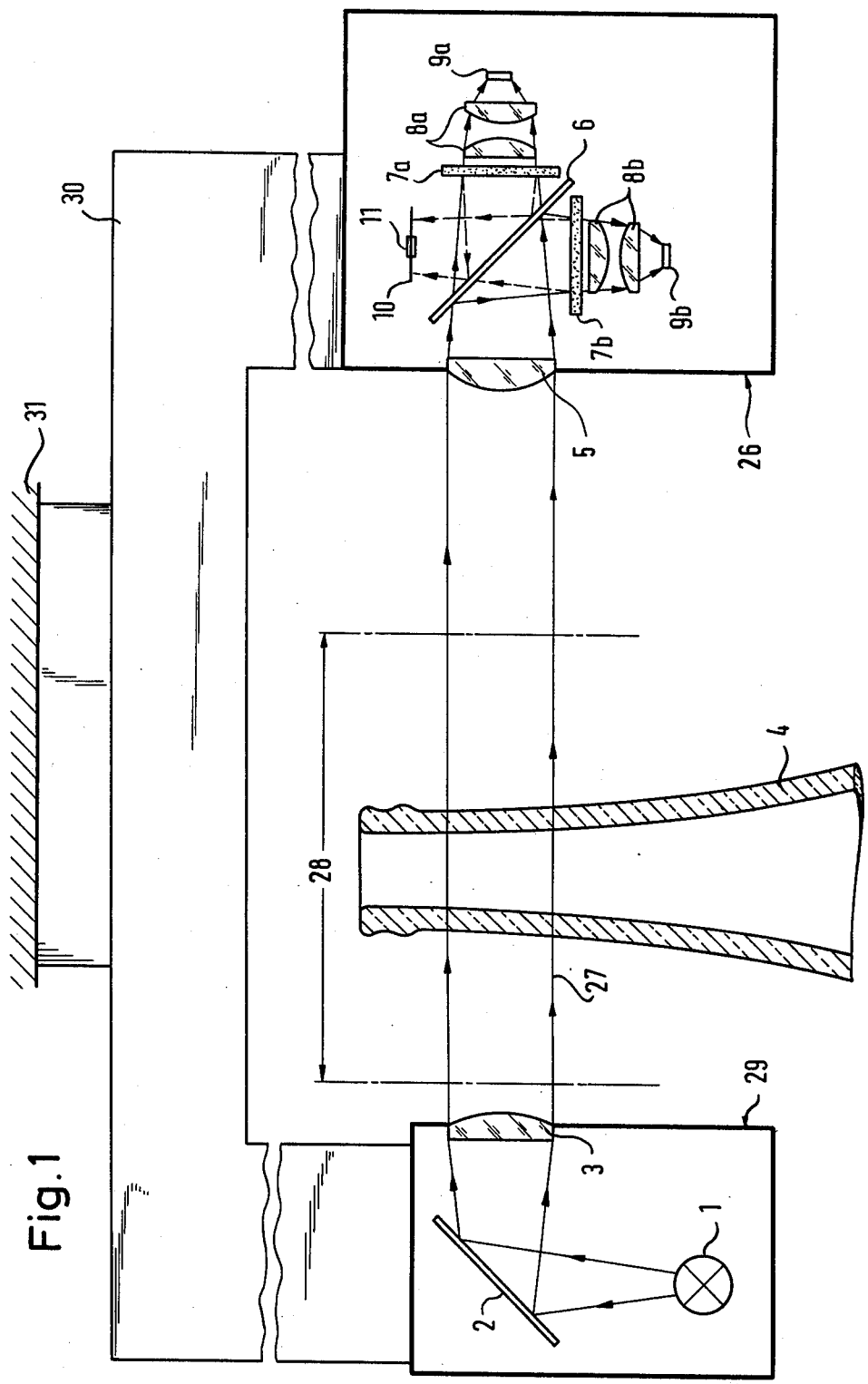
FIG. 1 a schematic side view partly in section of the optical part of the apparatus according to the invention, whereby the bottle conveying direction is at right angles to the drawing plane.

According to FIG. 1 a light transmitter 29 and the spectral decomposition arrangement 26 are arranged on opposite sides of an operating area 28 traversed by the neck of the bottle 4, and are fixed via a supporting arm 30 to a member 31 which is integral with the machine. The light transmitter 29 contains a light source 1, preferably constructed as a halogen lamp, whose upwardly transmitted light beam is deflected by 90° on a plane mirror to an objective lens 3 which produces a parallel light beam 27 passing through the operating area at right angles to the bottle conveying direction.

On the opposite side, the parallel light beam 27 is received by an objective 5 and is concentrated on photoelectric cells 9a or 9b by means of a physical beam splitter 6 via in each case one interference filter 7a or 7b and two condensers 8a or 8b. The filters are selected in such a way that, for example, filter 7a is substantially pervious for green and filter 7b substantially pervious for brown. As a result, when green bottle necks pass through the operating area 28, an electrical output signal substantially only appears on photoelectric cell 9a, when a brown bottle neck passes through it substantially only appears on photoelectric cell 9b, and when a transparent white bottle neck or no bottle passes through the electrical output signal appears on both photoelectric cells 9a, 9b.

Figure 4:
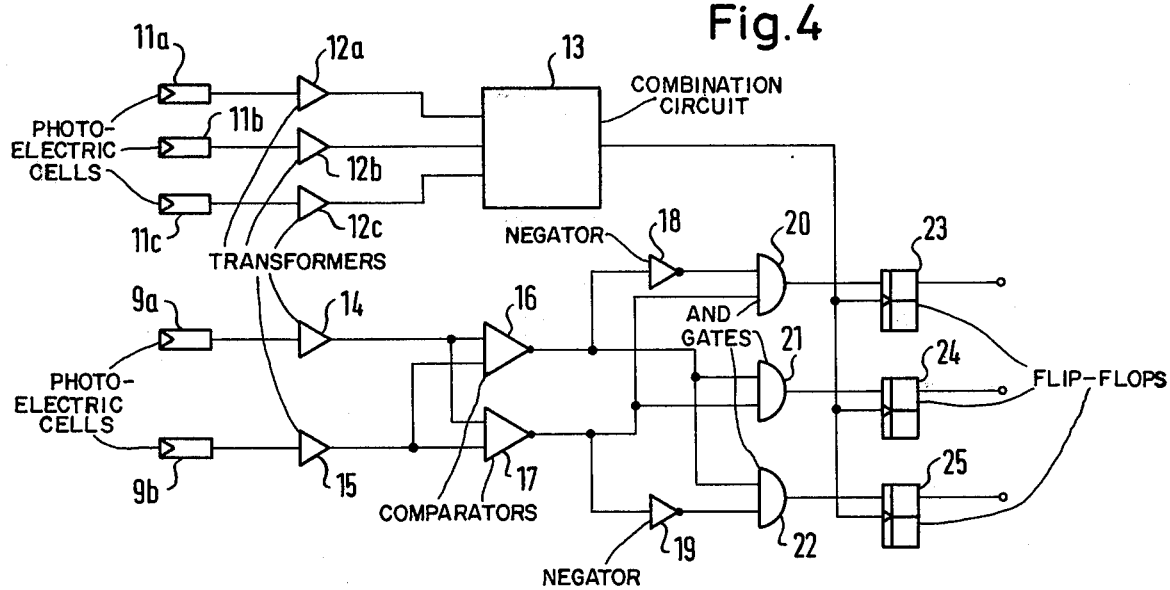
FIG. 4 a block circuit diagram of the evaluation electronics used in the apparatus according to the invention.

According to FIG. 4, the photoelectric cells 9a, 9b are applied to the inputs of two comparators 16, 17, via in each case a current-voltage transformer 14, 15, at whose output an O signal appears in the case of the same input voltages. Depending on the sign at comparator 16, if there is a certain minimum difference in the input voltages an L signal appears and on comparator 17 an O signal, or on comparator 16 an O signal and on comparator 17 an L signal. The outputs of comparators 16, 17 are applied via negators 18, 19 to an input of two AND gates 20, 22 as well as directly to the other inputs of the said two AND gates 20, 22 and directly to the two inputs of a further AND gate 21. The interconnection shown in the drawing is thereby such that if a brown bottle is present in the operating area 28, a signal appears at the output of gate 20, when a transparent bottle is present it appears at the output of AND gate 21 and when a green bottle is present it appears at the output of AND gate 22.

Figure 2:
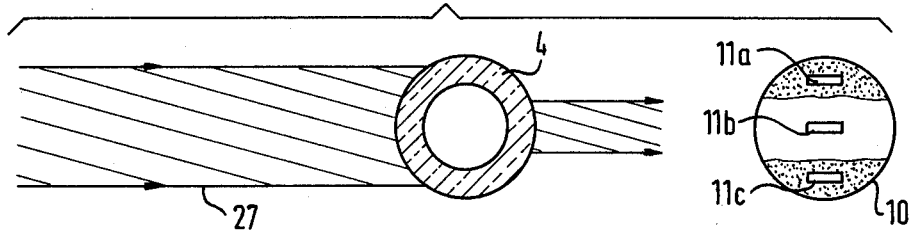
FIG. 2 is a schematic plan view of the operating area of the apparatus shown in FIG. 1 and the correspondingly illuminated timing photoelectric cell arrangement.

According to FIG. 1, the light reflected on filters 7a, 7b or condensers 8a, 8b is utilised to act on a group of timing photoelectric cells 11a, 11b and 11c arranged on the fourth side of the beam splitter 6 in the image plane 10 of the operating area. FIG. 2 shows how with the arrangement according to the invention the three photoelectric cells 11a, 11b, 11c are acted upon in the beam path in the presence of the neck of a bottle 4. The arrangement is such that in this case only the central photoelectric cell 11b is illuminated, whilst the photoelectric cells 11a, 11c on either side receive no light.

Figure 3:
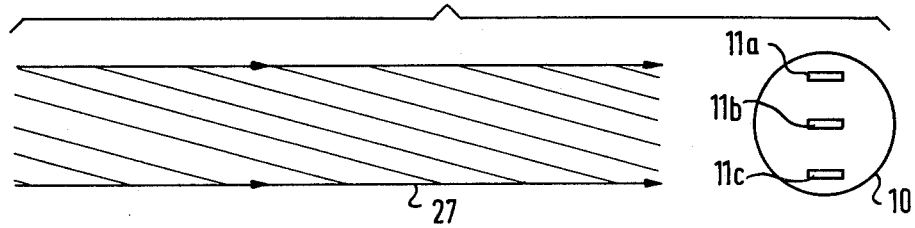
FIG. 3 a view analogous to that of FIG. 2 without a bottle neck in the beam path.

If according to FIG. 3 there is no bottle in operating area 28, the reduction of the width of the light beam 27 shown in FIG. 2 does not occur so that here all three timing photoelectric cells 11a, 11b, 11c are illuminated.

In the circuit according to FIG. 4, this varying influencing of the three timing photoelectric cells 11a, 11b, 11c is utilised via current-voltage transformers 12a, 12b, 12c associated with each photoelectric cell for acting on an electronic combinatorial circuit 13 which at the output only supplies an L signal if the central photoelectric cell 11b emits a much higher output signal than the photoelectric cells 11a or 11c on either side. This is the case when a bottle neck is present in the operating area 28 and the width of the light beam 27 is reduced in accordance with FIG. 2.

The output signal of the combinatorial circuit is applied to three flip flops 23, 24, 25 which are also subject to the action of the outputs of AND gates 20, 21, 22. The output signal of the combinatorial circuit 13 provides the timing for the three acceptance flip flops 23, 24, 25.

If, according to FIG. 2, a bottle to be checked is located in light beam 27 an L signal is formed at the output of combinatorial circuit 13, and the flip flops 23, 24, 25 receive the command to accept the output signals of AND gates 20, 21, 22. Thus an L signal is formed at the output of one of the flip flops 23, 24, 25 which is characteristic for the bottle colour brown, transparent or green. It is important that these three output signals are maintained when the bottle moves out of the operating area 28, and only when the next bottle enters the said working area is it either changed or maintained in the same state if the bottle colour has not changed.

The signal outputs of the three flip flops 23, 24, 25 are preferably connected to a relay which controls the operation of an associated removal station or a bottle sorting station.

On the basis of the construction according to the invention, the apparatus functions in a particularly reliable manner so that the reliable identification of the three colours is not impaired by fluctuations in the bottle size, bottle colour, arrangement of the bottles in the light beam, etc.

It is also pointed out that when the neck of the bottle 4 passes into the light beam 27, initially only the photoelectric cells 11b, 11c receive light, whereas photoelectric cell 11a receives no light. As the bottle neck moves in further, photoelectric cell 11b becomes dark whereas 11a and 11c receive light. Finally the state shown in FIG. 2 is reached. Subsequently when the bottle neck leaves light beam 27, initially only 11b becomes dark, whereas 11a and 11c remain light, then 11c becomes dark whereas 11a and 11b remain light. Finally, all the photoelectric cells are illuminated again as shown in FIG. 3. It is decisive that only the states shown in FIGS. 2 and 3 supply a signal, whereas all the other states are suppressed by the electronics, i.e. the electronics derive no signal from the remaining states.

The invention is not limited to the embodiments described and represented hereinbefore and various modifications can be made thereto without passing beyond the scope of the invention.

What is claimed is:

1. An apparatus for the identification of bottle colors, comprising means for passing a light beam through the bottle, means for receiving the light beam passing through the bottle, said receiving means comprising a spectral decomposition arrangement which emits a signal characteristic of the bottle color, said spectral decomposition arrangement comprising two photoelectric cells with different filters, two comparators each having an input and an output, means for applying the output signals of said two photoelectric cells to the inputs of said two comparators, and means including three AND gates for combining the outputs of said two comparators for forming a white, green and brown signal, and means for emitting both the single signals of the photoelectric cells and the signals combined from the single signals.

2. An apparatus according to claim 1, wherein said light beam is a parallel light beam whose width is substantially the same as the bottle neck width and which is arranged at the height of the bottle neck.

3. An arrangement according to claim 1, wherein the spectral decomposition arrangement comprises a beam splitter adapted to divert the light to said two photoelectric cells.

4. An apparatus according to claim 1, comprising current-voltage transformers arranged between said photoelectric cells and the inputs of said comparators.

5. An apparatus according to claim 1, comprising evaluation electronic means, and means for supplying a read-out signal to said evaluation electronic means, said supplying means utilizing the reduction of the width of the light beam upon passage through the bottle neck.

6. An apparatus according to claim 5, comprising three additional photoelectric cells arranged successively in the beam path in such a way that when a bottle neck is present in the beam path all three photoelectric cells are illuminated by the light beam.

7. An apparatus according to claim 1, comprising evaluation electronic means, means for supplying a read-out signal to said evaluation electronic means utilizing the reduction of the light beam width upon passing through the bottle neck, three additional photoelectric cells successively arranged in the beam path, flip-flops for receiving the outputs of said AND gates, and a combinatorial circuit connected to said three additional photoelectric cells, said combinatorial circuit when receiving an output from one of said three additional photoelectric cells being adapted to accept a color signal occuring on one of said three AND gates when a bottle neck appears.

* * * * *